United States Patent
Lu (10) Patent No.: US 9,927,655 B2
(45) Date of Patent: Mar. 27, 2018

(54) DISPLAY PANEL COMPRISING FIRST AND SECOND COMPENSATION FILMS WHEREIN EACH OF THE FILMS HAS PHASE DELAYS IN PERIPHERY AREAS THAT ARE DIFFERENT THAN PHASE DELAYS OF CENTER AREAS, METHOD FOR FABRICATING THE SAME, AND DISPLAY DEVICE COMPRISING THE SAME

(71) Applicant: BOE TECHNOLOGY GROUP CO., LTD., Beijing (CN)

(72) Inventor: Jiaoming Lu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 12 days.

(21) Appl. No.: 15/211,449

(22) Filed: Jul. 15, 2016

(65) Prior Publication Data
US 2017/0192276 A1    Jul. 6, 2017

(30) Foreign Application Priority Data
Jan. 4, 2016  (CN) .......................... 2016 1 0004693

(51) Int. Cl.
*G02F 1/13363*    (2006.01)

(52) U.S. Cl.
CPC ............... *G02F 1/13363* (2013.01); *G02F 2001/133631* (2013.01); *G02F 2001/133633* (2013.01); *G02F 2413/02* (2013.01); *G02F 2413/05* (2013.01); *G02F 2413/08* (2013.01)

(58) Field of Classification Search
CPC ..... G02F 2001/133302; G02F 2413/06; G02F 2413/05; G02F 2413/02; G02F 2413/08; G02F 2001/133633; G02F 2001/133631
See application file for complete search history.

(56) References Cited

U.S. PATENT DOCUMENTS

| | | | | |
|---|---|---|---|---|
| 2008/0170183 A1* | 7/2008 | Sugiyama | .......... | G02B 27/2214 349/96 |
| 2010/0014033 A1* | 1/2010 | Kawasaki | .............. | G02B 5/201 349/117 |
| 2014/0176879 A1* | 6/2014 | Yang | ................... | G02F 1/13363 349/96 |

* cited by examiner

*Primary Examiner* — Paul Lee
(74) *Attorney, Agent, or Firm* — Nath, Goldberg & Meyer; Joshua B. Goldberg (57) ABSTRACT

The present invention provides a display panel, a method for fabricating the same and a display device. The display panel includes a first substrate and a second substrate which are assembled in an aligned manner. A first compensation film is provided on at least one side of the first substrate, a second compensation film is provided on at least one side of the second substrate, and the first compensation film and the second compensation film are used for compensating for phase delays of periphery areas of the first substrate and the second substrate, respectively, so that the phase delays of the periphery areas of the first substrate and the second substrate are the same as the phase delays of respective center areas thereof.

19 Claims, 1 Drawing Sheet

DISPLAY PANEL COMPRISING FIRST AND SECOND COMPENSATION FILMS WHEREIN EACH OF THE FILMS HAS PHASE DELAYS IN PERIPHERY AREAS THAT ARE DIFFERENT THAN PHASE DELAYS OF CENTER AREAS, METHOD FOR FABRICATING THE SAME, AND DISPLAY DEVICE COMPRISING THE SAME

FIELD OF THE INVENTION

The present invention relates to the field of display technology, and specifically relates to a display panel, a method for fabricating the same, and a display device.

BACKGROUND OF THE INVENTION

Liquid crystal display panels have a disadvantage of light leakage in a dark state, which results from phase delay occurring on glass substrates, due to external forces applied by periphery frames of display panels on upper and lower glass substrates, and an amplification effect on phase delay by liquid crystal in the display panels.

The specific reasons for light leakage in a dark state are as follows. Glass substrates are subjected to packaging forces of module frames, and stresses are generated in the glass substrates. In a case of no stress, the glass substrates are isotropic and phase delay does not occur on light transmitted through the glass substrates, and in a case where stresses are generated in the glass substrates, the glass substrates allow phase delay to occur on light transmitted therethrough. When displaying in a dart state, light transmission rate will be increased due to phase delay of lights allowed by the glass substrates and the amplification effect on phase delay by liquid crystal in the display panels, thereby increasing light leakage in a dark state.

The conventional method for solving the problem of light leakage in a dark state caused by the phase delays of the glass substrates is to arrange compensation films on the glass substrates. However, since periphery areas of display panels are subjected to external forces having different directions and sizes, phase delay of periphery areas of the glass substrates are also different. Therefore, the conventional compensation films, of which the optical axes have a fixed direction, cannot compensate phase delays of different areas of the glass substrates.

SUMMARY OF THE INVENTION

In view of the above technical problem in the prior art, the present invention provides a display panel, a method for fabricating the same and a display device. By arranging first and second compensation films, the display panel can make that phase delays of respective areas of a first substrate and a second substrate of the display panel tend to be consistent, thereby solving the problem of light leakage of the display panel in a dark state and improving display quality of the display panel.

The present invention provides a display panel, comprising a first substrate and a second substrate, wherein the first substrate and the second substrate are assembled in an aligned manner, a gap formed by assembling the first substrate and the second substrate is filled with liquid crystal, a first compensation film is provided on at least one side of the first substrate, a second compensation film is provided on at least one side of the second substrate, and the first compensation film and the second compensation film are used for compensating for phase delays of periphery areas of the first substrate and the second substrate, respectively, so that the phase delays of the periphery areas of the first substrate and the second substrate are the same as the phase delays of respective center areas thereof.

Preferably, the phase delays of at least portions of the periphery area of the first substrate are different, and the phase delays of at least portions of the periphery area of the second substrate are different; and at least portions of a periphery area of the first compensation film have different degrees to which they compensate for corresponding phase delays of at least portions of the periphery area of the first substrate, and at least portions of a periphery area of the second compensation film have different degrees to which they compensate for corresponding phase delays of at least portions of the periphery area of the second substrate.

Preferably, directions of optical axes of at least portions of the periphery area of the first compensation film are perpendicular to corresponding directions of optical axes of at least portions of the periphery area of the first substrate, respectively, and a direction of an optical axis of a center area of the first compensation film is consistent with a direction of an optical axis of the center area of the first substrate; and directions of optical axes of at least portions of the periphery area of the second compensation film are perpendicular to corresponding directions of optical axes of at least portions of the periphery area of the second substrate respectively, and a direction of an optical axis of a center area of the second compensation film is consistent with a direction of an optical axis of the center area of the second substrate.

Preferably, the first compensation film and the second compensation film are formed of liquid crystal;

at least portions of the periphery area of the first compensation film are formed of liquid crystal having different refractive indices, at least portions of the periphery area of the first compensation film and the center area thereof are formed of liquid crystal material having different refractive indices, and refractive indices of different areas of the first compensation film are directly proportional to corresponding values of phase delay of different areas of the first substrate, respectively; and at least portions of the periphery area of the second compensation film are formed of liquid crystal having different refractive indices, at least portions of the periphery area of the second compensation film and the center area thereof are formed of liquid crystal having different refractive indices, and refractive indices of different areas of the second compensation film are directly proportional to corresponding phase delay values of different areas of the second substrate, respectively.

Preferably, at least portions of the periphery area of the first compensation film have different thicknesses, and film thicknesses of different areas of the first compensation film are directly proportional to corresponding values of phase delay of different areas of the first substrate, respectively; and at least portions of the periphery area of the second compensation film have different thicknesses, and film thicknesses of different areas of the second compensation film are directly proportional to corresponding values of phase delay of different areas of the second substrate, respectively.

Preferably, the first compensation film and the second compensation film are formed by photoalignment;

light intensities for forming at least portions of the periphery area of the first compensation film are different, light intensities for forming at least portions of the periphery area of the first compensation film and the center area thereof are different, and light intensities for forming different areas of the first compensation film are directly proportional to corresponding values of phase delay of different areas of the first substrate, respectively; and light intensities for forming at least portions of the periphery area of the second compensation film are different, light intensities for forming at least portions of the periphery area of the second compensation film and the center area thereof are different, and light intensities for forming different areas of the second compensation film are directly proportional to corresponding values of phase delay of different areas of the second substrate, respectively.

Preferably, the first compensation film is arranged on one side of the first substrate facing the liquid crystal, and the second compensation film is arranged on one side of the second substrate facing the liquid crystal; or the first compensation film is arranged on one side of the first substrate opposite to the liquid crystal, and the second compensation film is arranged on one side of the second substrate opposite to the liquid crystal.

Preferably, the display panel further comprises a first polarizer and a second polarizer, the first polarizer is arranged on an outermost side of the first substrate opposite to the liquid crystal, and the second polarizer is arranged on an outermost side of the second substrate opposite to the liquid crystal; and a polarization direction of the first polarizer is perpendicular to a polarization direction of the second polarizer.

The present invention further provides a display device, comprising the above display panel.

The present invention further provides a method for fabricating the above display panel, which comprises steps of forming the first compensation film on at least one side of the first substrate and forming the second compensation film on at least one side of the second substrate, wherein the first compensation film and the second compensation film are used for compensating the phase delays of the periphery areas of the first substrate and the second substrate, respectively, so that the phase delays of the periphery areas of the first substrate and the second substrate are the same as the phase delays of the respective center areas thereof.

Preferably, the steps of forming the first compensation film on at least one side of the first substrate and forming the second compensation film on at least one side of the second substrate comprise steps of:

first, coating, on at least one side of the first substrate, a liquid crystal material layer for forming the first compensation film, and coating, on at least one side of the second substrate, a liquid crystal material layer for forming the second compensation film;

and then, performing photoalignment, separately, on different areas of the liquid crystal material layer for forming the first compensation film, and performing photoalignment, separately, on different areas of the liquid crystal material layer for forming the second compensation film.

Preferably, the step of performing photoalignment separately on different areas comprises: irradiating, by light having different polarization directions, to different areas of the liquid crystal material layer for forming the first compensation film, so that directions of optical axes of at least portions of the periphery area of the first compensation film are perpendicular to corresponding directions of optical axes of at least portions of the periphery area of the first substrate, respectively, and a direction of an optical axis of the center area of the first compensation film is consistent with a direction of an optical axis of the center area of the first substrate;

and simultaneously, irradiating, by light having different polarization directions, to different areas of the liquid crystal material layer for forming the second compensation film, so that directions of optical axes of at least portions of the periphery area of the second compensation film are perpendicular to corresponding directions of optical axes of at least portions of the periphery area of the second substrate, respectively, and a direction of an optical axis of the center area of the second compensation film is consistent with a direction of an optical axis of the center area of the second substrate.

Preferably, the step of performing photoalignment separately on different areas further comprises: irradiating, by light having different intensities, to different areas of the liquid crystal material layer for forming the first compensation film, and light intensities of different areas of the liquid crystal material layer for forming the first compensation film are directly proportional to values of phase delay of different areas of the first substrate corresponding to different areas of the first compensation film;

and simultaneously, irradiating, by light having different intensities, to different areas of the liquid crystal material layer for forming the second compensation film, and light intensities of different areas of the liquid crystal material layer for forming the second compensation film are directly proportional to values of phase delay of different areas of the second substrate corresponding to different areas of the second compensation film.

Preferably, the step of coating liquid crystal material layers on the first substrate and the second substrate comprises: coating liquid crystal materials with different refractive indices to form different areas of the first compensation film, and refractive indices of liquid crystal materials for forming different areas of the first compensation film are directly proportional to values of phase delay of different areas of the first substrate corresponding to different areas of the first compensation film;

and simultaneously, coating liquid crystal materials with different refractive indices to form different areas of the second compensation film, and refractive indices of liquid crystal materials for forming different areas of the second compensation film are directly proportional to values of phase delay of different areas of the second substrate corresponding to different areas of the second compensation film.

Preferably, the step of coating liquid crystal material layers on the first substrate and the second substrate comprises: coating the liquid crystal material layer with different thicknesses to form different areas of the first compensation film, and thicknesses of the liquid crystal material layer for forming different areas of the first compensation film are directly proportional to values of phase delay of different areas of the first substrate corresponding to different areas of the first compensation film;

and simultaneously, coating the liquid crystal material layer with different thicknesses to form different areas of the second compensation film, and thicknesses of the liquid crystal material layer for forming different areas of the second compensation film are directly proportional to values of phase delay of different areas of the second substrate corresponding to different areas of the second compensation film.

Preferably, the method further comprises a step of forming a first polarizer on an outermost side of the first substrate opposite to the second substrate, and forming a second polarizer on an outermost side of the second substrate opposite to the first substrate.

The beneficial effects of the present invention are as follows. In the display panel provided by the present invention, by providing the first compensation film and the second compensation film, the phase delays of the periphery areas of the first substrate and the second substrate can be compensated, respectively, so that the phase delays of the periphery areas of the first substrate and the second substrate are the same as that of respective center areas thereof, and thus phase delays of respective areas of the first substrate and the second substrate of the display panel tend to be consistent, thereby solving the problem of light leakage of the display panel in a dark state and improving display quality of the display panel.

By using the above display panel, the display device provided by the present invention can solve the problem of light leakage of the display device in a dark state and improve display quality of the display device.

REFERENCE NUMERALS 1 first substrate; 2 second substrate; 3 liquid crystal; 4 first compensation film; 5 second compensation film; 6 first polarizer; 7 second polarizer

DETAILED DESCRIPTION

In order to make those skilled in the art better understand the technical solutions of the present invention, a display panel, a method for fabricating the same and a display device provided by the present invention will be further described in detail below in conjunction with the accompanying drawings and specific implementations.

First Embodiment

Figure 1:
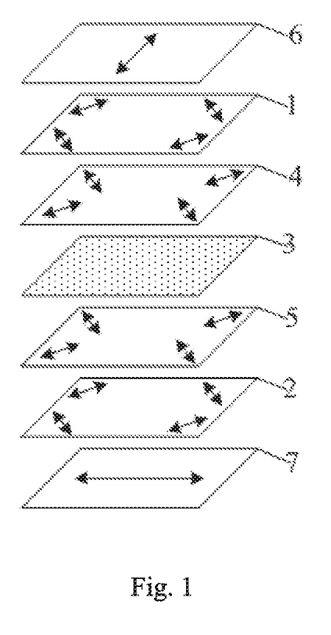
FIG. 1 is a structural exploded view of a display panel provided by a first embodiment of the present invention.

As shown in FIG. 1, the present embodiment provides a display panel, which comprises a first substrate 1 and a second substrate 2, wherein the first substrate 1 and the second substrate 2 are assembled in an aligned manner, a gap formed by assembling the first substrate 1 and the second substrate 2 is filled with liquid crystal 3, a first compensation film 4 is provided on at least one side of the first substrate 1, a second compensation film 5 is provided on at least one side of the second substrate 2, and the first compensation film 4 and the second compensation film 5 are used for compensating phase delays of periphery areas in the first substrate 1 and the second substrate 2, respectively, so that the phase delays of the periphery areas in the first substrate 1 and the second substrate 2 are the same as the phase delays of respective center areas thereof.

By providing the first compensation film 4 and the second compensation film 5, the phase delays of the periphery areas of the first substrate 1 and the second substrate 2 are compensated, respectively, so that the phase delays of the periphery areas of the first substrate 1 and the second substrate 2 are the same as the phase delays of respective center areas thereof, thus phase delays of respective areas of the first substrate 1 and the second substrate 2 of the display panel tend to be consistent, thereby solving the problem of light leakage of the display panel in a dark state and improving display quality of the display panel.

Here, at least portions of the periphery area of the first substrate 1 have different phase delays, and at least portions of the periphery area of the second substrate 2 have different phase delays; the first compensation film 4 performs phase compensation for the periphery area of the first substrate, and the second compensation film 5 performs phase compensation for the periphery area of the second substrate. That is, since forces applied to at least portions of the periphery area of the first substrate 1 are different, and forces applied to at least portions of the periphery area of the second substrate 2 are different, different areas of the first substrate 1 and the second substrate 2 are correspondingly compensated by the first compensation film 4 and the second compensation film 5, respectively, so that phase delays of respective areas of the first substrate 1 and the second substrate 2 tend to be consistent, thereby avoiding the problem of light leakage of the display panel when displaying in a dark state.

In the present embodiment, directions of optical axes of at least portions of a periphery area of the first compensation film 4 are perpendicular to corresponding directions of optical axes of at least portions of the periphery area of the first substrate 1, respectively, and a direction of an optical axis of a center area of the first compensation film 4 is consistent with a direction of an optical axis of the center area of the first substrate 1; directions of optical axes of at least portions of a periphery area of the second compensation film 5 are perpendicular to corresponding directions of optical axes of at least portions of the periphery area of the second substrate 2, respectively, and a direction of an optical axis of a center area of the second compensation film 5 is consistent with a direction of an optical axis of the center area of the second substrate 2. By such arrangement, the first compensation film 4 and the second compensation film 5 can compensate the periphery areas of the first substrate 1 and the second substrate 2, respectively, in directions of optical axes.

In addition, since packaging forces applied by frames on the center areas of the first substrate 1 and the second substrate 2 are very small and much close to zero, phase delay will not occur on the center areas of the first substrate 1 and the second substrate 2. Therefore, by arranging directions of optical axes of the center areas of the first compensation film 4 and the second compensation film 5 to be consistent with corresponding directions of optical axes of the center areas of the first substrate 1 and the second substrate 2, respectively, the center areas of the first compensation film 4 and the second compensation film 5 will not compensate the first substrate 1 and the second substrate 2 in directions of optical axes.

In the present embodiment, the first compensation film 4 and the second compensation film 5 are formed of liquid crystal; at least portions of the periphery area of the first compensation film 4 is formed of liquid crystal having different refractive indices, at least portions of the periphery area of the first compensation film 4 and the center area thereof are formed of liquid crystal having different refractive indices, and refractive indices of different areas of the first compensation film 4 are directly proportional to corresponding values of phase delay of different areas of the first substrate 1, respectively. At least portions of the periphery area of the second compensation film 5 is formed of liquid crystal having different refractive indices, at least portions of the periphery area of the second compensation film 5 and the center area thereof are formed of liquid crystal having different refractive indices, and refractive indices of different areas of the second compensation film 5 are directly proportional to corresponding values of phase delay of different areas in the second substrate 2, respectively. By such arrangement, different areas of the first compensation film 4 and the second compensation film 5 are formed of liquid crystal having different refractive indices, thereby implementing compensation for values of phase delay of different areas of the first substrate 1 and the second substrate 2.

By arranging different directions of optical axes and phase delay values of different areas of the first compensation film 4 and the second compensation film 5, different phase delays of different areas in the first substrate 1 and the second substrate 2 can be compensated differently, so that phase delays of different areas of the first substrate 1 and the second substrate 2 tend to be consistent, thereby avoiding the problem of light leakage of the display panel in a dark state.

In the present embodiment, the first compensation film 4 is arranged on one side of the first substrate 1 facing the liquid crystal 3, and the second compensation film 5 is arranged on one side of the second substrate 2 facing the liquid crystal 3. By such arrangement, the first compensation film 4 and the second compensation film 5 will not be easily scratched or damaged during conveying substrates in subsequent processes (because during conveying the first substrate 1 provided with the first compensation film 4 and the second substrate 2 provided with the second compensation film 5, the substrates are in contact with a conveyor belt, and the compensation films are opposite to the conveyor belt so as to not be in contact with the conveyor belt), so that formation of the first compensation film 4 and the second compensation film 5 will not influence display effect.

It should be noted that a piece of the first compensation film 4 can be arranged on each of two sides of the first substrate 1, respectively, and the two pieces of the first compensation films 4 jointly compensate for the phase delays of the first substrate 1; a piece of the second compensation film 5 can be arranged on each of two sides of the second substrate 2, respectively, and the two pieces of the second compensation films 5 jointly compensate for the phase delays of the second substrate 2.

In the present embodiment, the display panel further comprises a first polarizer 6 and a second polarizer 7, wherein the first polarizer 6 is arranged on an outermost side of the first substrate 1 opposite to the liquid crystal 3, and the second polarizer 7 is arranged on an outermost side of the second substrate 2 opposite to the liquid crystal 3; a polarization direction of the first polarizer 6 is perpendicular to a polarization direction of the second polarizer 7. By arranging the first polarizer 6 and the second polarizer 7 on outermost sides of the first substrate 1 and the second substrate 2 opposite to the liquid crystal 3, respectively, the display panel can perform normal display without being affected by the first compensation film 4 and the second compensation film 5.

It should be noted that a plurality of other film layers may be further provided on the first substrate 1 and the second substrate 2. For example, in a case where the first substrate 1 is a color filter substrate, the first substrate 1 is provided with a color filter layer, a black matrix layer and the like, and in a case where the second substrate 2 is an array substrate, the second substrate 2 is provided with a gate electrode layer, a pixel electrode layer, a source and drain electrode layer, a plurality of insulation layers and the like. The first compensation film 4 can be arranged as a layer at any position on the first substrate 1, the second compensation film 5 can be arranged as a layer at any position on the second substrate 2, and there is no limitation to positions of the first compensation film 4 and the second compensation film 5 arranged on the first substrate 1 and the second substrate 2, respectively.

Based on the above structure of the display panel in the present embodiment, the present embodiment further provides a method for fabricating the display panel, which comprises steps of forming the first compensation film 4 on at least one side of the first substrate 1 and forming the second compensation film 5 on at least one side of the second substrate 2, wherein the first compensation film 4 and the second compensation film 5 are used for compensating for phase delays of the periphery areas of the first substrate 1 and the second substrate 2, respectively, so that the phase delays of the periphery areas of the first substrate 1 and the second substrate 2 are the same as the phase delays of the respective center areas thereof.

Here, the steps of forming the first compensation film 4 on at least one side of the first substrate 1 and forming the second compensation film 5 on at least one side of the second substrate 2 comprise a step of:

first, coating, on at least one side of the first substrate, a liquid crystal material layer for forming the first compensation film 4, and coating, on at least one side of the second substrate 2, a liquid crystal material layer for forming the second compensation film 5, wherein this step specifically comprises: coating liquid crystal materials having different refractive indices to form different areas of the first compensation film 4, wherein refractive indices of liquid crystal materials for forming different areas in the first compensation film 4 are directly proportional to values of phase delay of different areas of the first substrate 1 corresponding to different areas of the first compensation film 4, and simultaneously, coating liquid crystal materials having different refractive indices to form different areas of the second compensation film 5, wherein refractive indices of liquid crystal materials for forming different areas of the second compensation film 5 are directly proportional to values of phase delay of different areas of the second substrate 2 corresponding to different areas of the second compensation film 5;

and then, performing photoalignment, separately, on different areas of the liquid crystal material layer for forming the first compensation film 4, and performing photoalignment, separately, on different areas of the liquid crystal material layer for forming the second compensation film 5.

Specifically, the step of performing photoalignment separately on different areas comprises: irradiating, by light having different polarization directions, to different areas of the liquid crystal material layer for forming the first compensation film 4, so that directions of optical axes of at least portions of the periphery area of the first compensation film 4 are perpendicular to corresponding directions of optical axes of at least portions of the periphery area of the first substrate 1, respectively, and a direction of an optical axis of the center area of the first compensation film 4 is consistent with a direction of an optical axis of the center area in the first substrate 1; and simultaneously, irradiating, by light having different polarization directions, to different areas of the liquid crystal material layer for forming the second compensation film 5, so that directions of optical axes of at least portions of the periphery area of the second compensation film 5 are perpendicular to corresponding directions of optical axes of at least portions of the periphery area of the second substrate 2, respectively, and a direction of an optical axis of the center area of the second compensation film 5 is consistent with a direction of an optical axis of the center area of the second substrate 2.

During performing photoalignment separately on different areas, different areas of the first compensation film 4 and the second compensation film 5 are photoaligned sequentially, and when performing photo alignment for a certain area, other areas, which are not photoaligned currently, are shielded by a mask. Photoalignment is performed by using ultraviolet light.

In the present embodiment, the first compensation film 4 is formed on one side of the first substrate 1 facing the liquid crystals 3, and the second compensation film 5 is arranged on one side of the second substrate 2 facing the liquid crystals 3. Needless to say, the first compensation film 4 can be formed on each of two sides of the first substrate 1, respectively, and the second compensation film 5 can be formed on each of two sides of the second substrate 2, respectively.

In addition, the method for fabricating the display panel provided by the present embodiment further comprises steps of forming the first polarizer 6 on the outermost side of the first substrate 1 opposite to the second substrate 2, and forming the second polarizer 7 on the outermost side of the second substrate 2 opposite to the first substrate 1. The method for fabricating the first polarizer 6 and the second polarizer 7 is the same as conventional fabricating method, of which the description is omitted herein.

Second Embodiment

The present embodiment provides a display panel, which differs from that provided by the first embodiment in that: at least portions of the periphery area in the first compensation film have different thicknesses; film thicknesses of different areas of the first compensation film are directly proportional to corresponding values of phase delay of different areas of the first substrate, respectively; film thicknesses of at least portions of the periphery area of the second compensation film are different; and film thicknesses of different areas of the second compensation film are directly proportional to corresponding values of phase delay of different areas in the second substrate, respectively.

By such arrangement, different areas of the first compensation film and the second compensation film can have different thicknesses, thereby compensating for values of phase delay of different areas of the first substrate and the second substrate.

Correspondingly, the method for fabricating the display panel provided by the present embodiment differs from that of the first Embodiment in that the step of coating liquid crystal material layers on the first substrate and the second substrate comprises: coating the liquid crystal material layer with different thicknesses to form different areas of the first compensation film; thicknesses of the liquid crystal material layer for forming different areas in the first compensation film are directly proportional to values of phase delay of different areas of the first substrate corresponding to different areas of the first compensation film; and simultaneously, coating the liquid crystal material layer with different thicknesses to form different areas of the second compensation film; thicknesses of the liquid crystal material layer for forming different areas of the second compensation film are directly proportional to values of phase delay of different areas of the second substrate corresponding to different areas of the second compensation film.

In the present embodiment, remaining structures of the display panel and remaining steps of the method for fabricating the display panel are the same as that of the first embodiment, of which the description is omitted herein.

In the present embodiment, by arranging different directions of optical axes and values of phase delay of different areas of the first compensation film and the second compensation film, different phase delays of different areas in the first substrate and the second substrate can be compensated for differently, so that phase delays of different areas of the first substrate and the second substrate tend to be consistent, thereby avoiding the problem of light leakage of the display panel in a dark state.

Third Embodiment

The present embodiment provides a display panel, which differs from that provided by the first and second embodiments in that: the first compensation film and the second compensation film are both formed by photoalignment; light intensities for forming at least portions of the periphery area of the first compensation film are different, and light intensities for forming at least portions of the periphery area of the first compensation film and the center area thereof are different; light intensities for forming different areas of the first compensation film are directly proportional to corresponding values of phase delay of different areas in the first substrate, respectively; light intensities for forming at least portions of the periphery area of the second compensation film are different, and light intensities for forming at least portions of the periphery area of the second compensation film and the center area thereof are different; light intensities for forming different areas of the second compensation film are directly proportional to corresponding values of phase delay of different areas in the second substrate, respectively.

By such arrangement, light intensities for forming different areas of the first compensation film and the second compensation film can be different, thereby implementing compensation for values of phase delay of different areas of the first substrate and the second substrate.

Correspondingly, the display panel provided by the present embodiment differs from those provided by the first and second embodiments in that: when performing photoalignment, light irradiated to different areas of the liquid crystal material layer for forming the first compensation film has different intensities; light intensities corresponding to different areas of the liquid crystal material layer for forming the first compensation film are directly proportional to values of phase delay of different areas in the first substrate corresponding to different areas of the first compensation film; and simultaneously, light irradiated to different areas of the liquid crystal material layer for forming the second compensation film has different intensities; light intensities of different areas of the liquid crystal material layer for forming the second compensation film are directly proportional to values of phase delay of different areas of the second substrate corresponding to different areas of the second compensation film.

In the present embodiment, remaining structures of the display panel and remaining steps of the method for fabricating the display panel are the same as that of the first embodiment, of which the description is omitted herein.

In the present embodiment, by arranging different directions of optical axes and values of phase delay of different areas of the first compensation film and the second compensation film, different phase delays of different areas in the first substrate and the second substrate can be compensated for differently, so that phase delays of different areas of the first substrate and the second substrate tend to be consistent, thereby avoiding the problem of light leakage of the display panel in a dark state.

Fourth Embodiment

The present embodiment provides a display panel, which differs from those of the first to third embodiments in that: in order to compensate for values of phase delay of the first substrate and the second substrate, different areas of the first compensation film and the second compensation film in the present embodiment are formed by liquid crystal materials having different refractive indices, different areas of the first compensation film and the second compensation film have different thicknesses, and simultaneously, different areas of the first compensation film and the second compensation film are formed by photoalignment with different light intensities, respectively. In other words, values of phase delay of the first substrate and the second substrate are compensated for by the three above-described compensation ways simultaneously.

Correspondingly, the method for fabricating the display panel provided by the present embodiment differs from those provided by the first to third embodiments in that: coating liquid crystal materials having different refractive indices to form different areas of the first compensation film, coating the liquid crystal material layer with different thicknesses to form different areas of the first compensation film, and irradiating, by light having different intensidies, to different areas of the liquid crystal material layer for forming the first compensation film; coating liquid crystal materials having different refractive indices to form different areas of the second compensation film, coating the liquid crystal material layer with different thicknesses to form different areas of the second compensation film, and irradiating, by light having different intensidies, to different areas of the liquid crystal material layer for forming the second compensation film.

In the present embodiment, remaining structures of the display panel and remaining steps of the method for fabricating the display panel are the same as that of the first embodiment, of which the description is omitted herein.

In addition, it should be noted that in order to compensate values of phase delay of the first substrate and the second substrate, any two of the following three compensation ways can be adopted to compensate different areas of the first compensation film and the second compensation film, said three compensation ways including: using liquid crystal materials having different refractive indices, or having different thicknesses, or using different light intensities for photoalignment.

Fifth Embodiment

Figure 2:
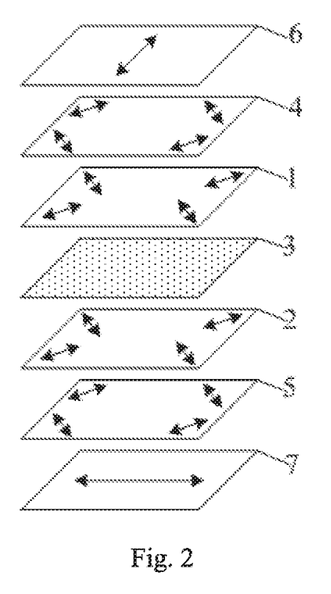
FIG. 2 is a structural exploded view of a display panel provided by a fifth embodiment of the present invention.

The present embodiment provides a display panel, which, as shown in FIG. 2, differs from those provided by the first to fourth embodiments in that, the first compensation film 4 is arranged on one side of the first substrate 1 opposite to the liquid crystal 3, and the second compensation film 5 is arranged on one side of the second substrate 2 opposite to the liquid crystal 3.

In the present embodiment, remaining structures of the display panel and the method for fabricating the display panel are the same as those provided by any one of the first to fourth embodiments, of which the description is omitted herein.

The beneficial effects of the first to fifth embodiments are as follows. In the display panel provided by the first to fifth embodiments, by providing the first compensation film and the second compensation film, phase delays of periphery areas in the first substrate and the second substrate can be compensated respectively, so that the phase delays of the periphery areas of the first substrate and the second substrate are the same as that of respective center areas thereof, and thus it avoids the occurrence of phase delays of the first substrate and the second substrate of the display panel due to packaging forces applied by frames, thereby solving the problem of light leakage of the display panel in a dark state and improving display quality of the display panel.

Sixth Embodiment

The present embodiment provides a display device, comprising the display panel in any one of the first to fifth embodiments.

By using the display panel in any one of the first to fifth embodiments 1-5, the problem of light leakage of the display device in a dark state is solved and display quality of the display device is improved.

The display device may be any product or component having a display function, such as a mobile phone, a tablet computer, a TV set, a display, a notebook computer, a digital photo frame, a navigator or the like.

It can be understood that the above implementations are merely exemplary implementations used for illustrating the principle of the present invention, but the present invention is not limited thereto. Those of ordinary skill in the art can make various modifications and improvements without departing from the spirit and essence of the present invention, and these modifications and improvements also fall into the protection scope of the present invention.

The invention claimed is:

1. A display panel comprising a first substrate and a second substrate, wherein the first substrate and the second substrate are assembled in an aligned manner, a gap formed by assembling the first substrate and the second substrate is filled with liquid crystal, a first compensation film is provided on at least one side of the first substrate, a second compensation film is provided on at least one side of the second substrate, and the first compensation film and the second compensation film are used for compensating for phase delays of periphery areas of the first substrate and the second substrate, respectively, so that the phase delays of the periphery areas of the first substrate and the second substrate are the same as the phase delays of center areas of the first substrate and the second substrate, respectively, wherein the phase delays of at least portions of the periphery area of the first substrate are different, and the phase delays of at least portions of the periphery area of the second substrate are different; and the first compensation film compensates for the phase delay of the periphery area of the first substrate, and the second compensation film compensates for the phase delay of the periphery area of the second substrate.

2. The display panel according to claim 1, wherein directions of optical axes of at least portions of a periphery area of the first compensation film are perpendicular to corresponding directions of optical axes of at least portions of the periphery area of the first substrate, respectively, and a direction of an optical axis of a center area of the first compensation film is consistent with a direction of an optical axis of the center area of the first substrate; and directions of optical axes of at least portions of a periphery area of the second compensation film are perpendicular to corresponding directions of optical axes of at least portions of the periphery area of the second substrate, respectively, and a direction of an optical axis of a center area of the second compensation film is consistent with a direction of an optical axis of the center area of the second substrate.

3. The display panel according to claim 1, wherein the first compensation film and the second compensation film are formed of liquid crystal;

at least portions of a periphery area of the first compensation film are formed of liquid crystal having different refractive indices, at least portions of the periphery area of the first compensation film and a center area of the first compensation film are formed of liquid crystal having different refractive indices, and refractive indices of different areas of the first compensation film are directly proportional to corresponding values of phase delay of different areas of the first substrate, respectively; and at least portions of a periphery area of the second compensation film is formed of liquid crystal having different refractive indices, at least portions of the periphery area of the second compensation film and a center area of the second compensation film are formed of liquid crystal having different refractive indices, and refractive indices of different areas of the second compensation film are directly proportional to corresponding values of phase delay of different areas of the second substrate, respectively.

4. The display panel according to claim 2, wherein the first compensation film and the second compensation film are formed of liquid crystal;

at least portions of a periphery area of the first compensation film are formed of liquid crystal having different refractive indices, at least portions of the periphery area of the first compensation film and a center area of the first compensation film are formed of liquid crystal having different refractive indices, and refractive indices of different areas of the first compensation film are directly proportional to corresponding values of phase delay of different areas of the first substrate, respectively; and at least portions of a periphery area of the second compensation film is formed of liquid crystal having different refractive indices, at least portions of the periphery area of the second compensation film and a center area of the second compensation film are formed of liquid crystal having different refractive indices, and refractive indices of different areas of the second compensation film are directly proportional to corresponding values of phase delay of different areas of the second substrate, respectively.

5. The display panel according to claim 1, wherein at least portions of a periphery area of the first compensation film have different thicknesses, and the thicknesses of different areas of the first compensation film are directly proportional to corresponding values of phase delay of different areas of the first substrate, respectively;

at least portions of a periphery area of the second compensation film have different thicknesses, and the thicknesses of different areas of the second compensation film are directly proportional to corresponding values of phase delay of different areas of the second substrate, respectively.

6. The display panel according to claim 2, wherein at least portions of a periphery area of the first compensation film have different thicknesses, and the thicknesses of different areas of the first compensation film are directly proportional to corresponding values of phase delay of different areas of the first substrate, respectively;

at least portions of a periphery area of the second compensation film have different thicknesses, and the thicknesses of different areas of the second compensation film are directly proportional to corresponding values of phase delay of different areas of the second substrate, respectively.

7. The display panel according to claim 1, wherein the first compensation film and the second compensation film are formed by photoalignment;

light intensities for forming at least portions of a periphery area of the first compensation film are different, light intensities for forming at least portions of the periphery area of the first compensation film and a center area of the first compensation film are different, and light intensities for forming different areas of the first compensation film are directly proportional to corresponding values of phase delay of different areas of the first substrate, respectively;

light intensities for forming at least portions of a periphery area of the second compensation film are different, light intensities for forming at least portions of the periphery area of the second compensation film and a center area of the second compensation film are different, and light intensities for forming different areas of the formed second compensation film are directly proportional to corresponding values of phase delay of different areas of the second substrate, respectively.

8. The display panel according to claim 2, wherein the first compensation film and the second compensation film are formed by photoalignment;

light intensities for forming at least portions of a periphery area of the first compensation film are different, light intensities for forming at least portions of the periphery area of the first compensation film and a center area of the first compensation film are different, and light intensities for forming different areas of the first compensation film are directly proportional to corresponding values of phase delay of different areas of the first substrate, respectively;

light intensities for forming at least portions of a periphery area of the second compensation film are different, light intensities for forming at least portions of the periphery area of the second compensation film and a center area of the second compensation film are different, and light intensities for forming different areas of the formed second compensation film are directly proportional to corresponding values of phase delay of different areas of the second substrate, respectively.

9. The display panel according to claim 1, wherein the first compensation film is arranged on one side of the first substrate facing the liquid crystal, and the second compensation film is arranged on one side of the second substrate facing the liquid crystal; or the first compensation film is arranged on one side of the first substrate opposite to the liquid crystal, and the second compensation film is arranged on one side of the second substrate opposite to the liquid crystal.

10. The display panel according to claim 9, wherein the display panel further comprises a first polarizer and a second polarizer, the first polarizer being arranged on an outermost side of the first substrate opposite to the liquid crystal, and the second polarizer being arranged on an outermost side of the second substrate opposite to the liquid crystal; and a polarization direction of the first polarizer is perpendicular to a polarization direction of the second polarizer.

11. A display device, comprising the display panel according to claim 1.

12. A method for fabricating the display panel according to claim 1, comprising steps of: forming the first compensation film on at least one side of the first substrate, and forming the second compensation film on at least one side of the second substrate, wherein the first compensation film and the second compensation film are used for compensating for phase delays of the periphery areas of the first substrate and the second substrate, respectively, so that the phase delays of the periphery areas of the first substrate and the second substrate are the same as the phase delays of the center areas of the first substrate and the second substrate, respectively.

13. The method according to claim 12, wherein the step of forming the first compensation film on at least one side of the first substrate and forming the second compensation film on at least one side of the second substrate comprise steps of:

first, coating, on at least one side of the first substrate, a liquid crystal material layer for forming the first compensation film, and coating, on at least one side of the second substrate, a liquid crystal material layer for forming the second compensation film;

and then, performing photoalignment, separately, on different areas of the liquid crystal material layer for forming the first compensation film, and performing photoalignment, separately, on different areas of the liquid crystal material layer for forming the second compensation film.

14. The method according to claim 13, wherein the step of performing photo alignment separately on different areas comprises:

irradiating, by light having different polarization directions, to different areas of the liquid crystal material layer for forming the first compensation film, so that directions of optical axes of at least portions of a periphery area of the first compensation film are perpendicular to corresponding directions of optical axes of at least portions of the periphery area of the first substrate, respectively, and a direction of an optical axis of a center area in the first compensation film is consistent with a direction of an optical axis of the center area of the first substrate;

and simultaneously, irradiating, by light having different polarization directions, to different areas of the liquid crystal material layer for forming the second compensation film, so that directions of optical axes of at least portions of a periphery area of the second compensation film are perpendicular to corresponding directions of optical axes of at least portions of the periphery area of the second substrate, respectively, and a direction of an optical axis of a center area of the second compensation film is consistent with a direction of an optical axis of the center area of the second substrate.

15. The method according to claim 13, wherein the step of performing photoalignment separately on different areas further comprises:

irradiating, by light having different intensities, to different areas of the liquid crystal material layer for forming the first compensation film, light intensities of different areas of the liquid crystal material layer for forming the first compensation film being directly proportional to values of phase delay of different areas of the first substrate corresponding to different areas of the first compensation film;

and simultaneously, irradiating, by light having different intensities, to different areas of the liquid crystal material layer for forming the second compensation film, light intensities of different areas of the liquid crystal material layer for forming the second compensation film being directly proportional to values of phase delay of different areas of the second substrate corresponding to different areas of the second compensation film.

16. The method according to claim 14, wherein the step of performing photoalignment separately on different areas further comprises:

irradiating, by light having different intensities, to different areas of the liquid crystal material layer for forming the first compensation film, light intensities of different areas of the liquid crystal material layer for forming the first compensation film being directly proportional to values of phase delay of different areas of the first substrate corresponding to different areas of the first compensation film;

and simultaneously, irradiating, by light having different intensities, to different areas of the liquid crystal material layer for forming the second compensation film, light intensities of different areas of the liquid crystal material layer for forming the second compensation film being directly proportional to values of phase delay of different areas of the second substrate corresponding to different areas of the second compensation film.

17. The method according to claim 13, wherein the step of coating liquid crystal material layers on the first substrate and the second substrate comprises:

coating liquid crystal materials having different refractive indices to form different areas of the first compensation film, refractive indices of liquid crystal materials for forming different areas of the first compensation film being directly proportional to values of phase delay of different areas of the first substrate corresponding to different areas of the first compensation film;

and simultaneously, coating liquid crystal materials having different refractive indices to form different areas of the second compensation film, refractive indices of liquid crystal materials for forming different areas of the second compensation film being directly proportional to values of phase delay of different areas of the second substrate corresponding to different areas of the second compensation film.

18. The method according to claim 13, wherein the step of coating liquid crystal material layers on the first substrate and the second substrate comprises:

coating the liquid crystal material layer with different thicknesses to form different areas of the first compensation film, the thicknesses of the liquid crystal material layer for forming different areas of the first compensation film being directly proportional to values of phase delay of different areas of the first substrate corresponding to different areas of the first compensation film;

and simultaneously, coating the liquid crystal material layer with different thicknesses to form different areas of the second compensation film, the thicknesses of the liquid crystal material layer for forming different areas of the second compensation film being directly proportional to values of phase delay of different areas of the second substrate corresponding to different areas in the second compensation film.

19. The method according to claim 12, wherein the method further comprises a step of forming a first polarizer on an outermost side of the first substrate opposite to the second substrate, and forming a second polarizer on an outermost side of the second substrate opposite to the first substrate.

* * * * *